(12) United States Patent
Bonkowski et al.

(10) Patent No.: US 11,624,430 B2
(45) Date of Patent: Apr. 11, 2023

(54) STEER BY WIRE ROTATIONAL TRAVEL STOP

(71) Applicant: Steering Solutions IP Holding Corporation, Saginaw, MI (US)

(72) Inventors: Jeremy A. Bonkowski, Freeland, MI (US); Tyler M. Reno, Frankenmuth, MI (US); Laura F. Stock, Saginaw, MI (US); Timothy J. Bennett, Kawkawlin, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/538,485

(22) Filed: Nov. 30, 2021

(65) Prior Publication Data

US 2022/0128134 A1 Apr. 28, 2022

Related U.S. Application Data

(63) Continuation of application No. 17/020,110, filed on Sep. 14, 2020, now Pat. No. 11,204,082.

(60) Provisional application No. 62/962,467, filed on Jan. 17, 2020.

(51) Int. Cl.
*F16H 25/20* (2006.01)
*B62D 5/00* (2006.01)

(52) U.S. Cl.
CPC ......... *F16H 25/2015* (2013.01); *B62D 5/001* (2013.01); *F16H 2025/204* (2013.01)

(58) Field of Classification Search
CPC .......... F16H 25/2015; F16H 2025/204; F16H 25/20; B62D 5/001
See application file for complete search history.

(56) References Cited

U.S. PATENT DOCUMENTS

| | | | |
|---|---|---|---|
| 3,319,481 A | 5/1967 | Goodman | |
| 3,334,526 A | 8/1967 | Flarsheim | |
| 3,355,959 A | 12/1967 | Whicker | |
| 4,479,398 A | 10/1984 | Watanabe | |
| 5,088,339 A | 2/1992 | Lochmoeller | |
| 5,461,935 A | 10/1995 | Hill | |
| 5,704,249 A | 1/1998 | Krauska | |
| 8,459,133 B2 * | 6/2013 | Inoue | F16H 25/2015 74/567 |
| 8,800,402 B2 | 8/2014 | Weum | |
| 9,103,422 B2 * | 8/2015 | Wingett | F16H 25/2204 |
| 9,492,619 B2 | 11/2016 | Raab | |
| 10,160,477 B2 | 12/2018 | Bodtker et al. | |

(Continued)

*Primary Examiner* — David M Fenstermacher
(74) *Attorney, Agent, or Firm* — Dickinson Wright PLLC

(57) ABSTRACT

The present disclosure related to a travel stop assembly for preventing rotation, and undesired locking, of a shaft. The travel stop assembly may comprise a shaft that extends along an axis and is rotatable about the axis. A lead screw may extend along the axis and be operatively engaged, and rotatable, with the shaft about the axis. A nut may be in threaded engagement with the lead screw and axially movable along a length of the lead screw upon rotation of the lead screw. At least one stop pin may operatively engaged the lead screw and the at least one stop pin may extend from the lead screw perpendicularly relative to the axis. The stop pin may be positioned on the lead screw to stop rotation of the lead screw and the stop pin may prevent locking of the nut to the lead screw.

14 Claims, 14 Drawing Sheets

(56) References Cited

U.S. PATENT DOCUMENTS

| | | |
|---|---|---|
| 10,215,264 B2 | 2/2019 | Ungar et al. |
| 10,239,552 B2 | 3/2019 | Bodtker et al. |
| 10,357,613 B2 | 7/2019 | Jugl et al. |
| 10,837,530 B2 | 11/2020 | Tilloy et al. |
| 11,168,768 B1* | 11/2021 | Israr .................. G06F 3/016 |
| 2003/0146038 A1 | 8/2003 | Mills et al. |
| 2008/0190227 A1 | 8/2008 | Myers et al. |
| 2010/0152671 A1 | 6/2010 | Raab et al. |
| 2015/0119145 A1 | 4/2015 | Jaouen |
| 2016/0355207 A1 | 12/2016 | Urushibata |
| 2018/0238377 A1 | 8/2018 | Kim et al. |
| 2021/0163060 A1* | 6/2021 | Fujita .................. B62D 5/001 |
| 2021/0197784 A1* | 7/2021 | Drumm ............. F16H 25/2025 |
| 2021/0222759 A1* | 7/2021 | Bonkowski .......... B62D 5/001 |
| 2021/0245791 A1* | 8/2021 | Krone .................. B62D 1/181 |
| 2021/0332873 A1* | 10/2021 | Blesener ............ H02K 11/215 |
| 2022/0081026 A1* | 3/2022 | Weber .................. B62D 5/001 |
| 2022/0205518 A1* | 6/2022 | Sommerfeld ....... F16H 25/2015 |
| 2022/0228654 A1* | 7/2022 | Curtis ............... F16H 25/2454 |

\* cited by examiner

STEER BY WIRE ROTATIONAL TRAVEL STOP

CROSS-REFERENCE TO RELATED APPLICATIONS

This application is a continuation of U.S. patent Ser. No. 17/020,110, filed on Sep. 14, 2020, now U.S. Pat. No. 11,204,082, which claims priority to U.S. Provisional Application No. 62/962,467, filed on Jan. 17, 2020, the disclosures of which are incorporated by reference herein in their entirety.

BACKGROUND

As vehicle technology advances, being employed more frequently are hand-wheel actuators (HWA) and road-wheel actuators (RWA) to control travel of a vehicle and to replace direct mechanical linkages between the steering wheel and tires of a vehicle. During travel of the vehicle, the HWA and RWA cooperate with one another, through electrical communication (e.g., wires, sensors, and a central processing unit), to directionally control travel of the vehicle. More specifically, sensed movement of the respective hand-wheel and/or tires is electrically communicated to the respective HWA or RWA to cause movement of the hand-wheel and/or tires. However, such advancement in vehicle technology, and the complexity in the same, present unique challenges. For example, direct mechanical linkage between the hand-wheel and tires limit rotation of the hand-wheel thereby preventing damage to components of the hand-wheel/steering column assembly. A hand-wheel coupled to a HWA, however, is subject to over-rotation as there is no mechanical linkage/component limiting rotation. In turn, components such as a clock spring, an air bag coil, etc., of the HWA are subject to damage due to over-rotation of the hand-wheel.

SUMMARY

This disclosure generally relates to a travel stop assembly for preventing rotation, and undesired locking, of a shaft.

In an aspect of the disclosed embodiments, the travel stop assembly may comprise a travel stop housing having an inner surface that defines a channel extending along an axis. A lead screw that is at least partially located in the channel. A nut that is in threaded engagement with the lead screw and axially movable along the lead screw upon a rotation of the lead screw. At least one stop pin that is fixedly coupled to the lead screw, the at least one stop pin extends outwardly from the lead screw. At least one rail is fixed to the inner surface of the travel stop housing and extends towards the lead screw to prevent rotation of the nut. At least one stop arm extends from the nut and is positioned to engage the stop pin to stop axial movement of the nut.

In another aspect of the disclosed embodiments, a travel stop assembly may comprise a travel stop housing having an inner surface defining a channel that extends along an axis. A lead screw is at least partially located in the channel. A nut is in threaded engagement with the lead screw and axially movable along the lead screw upon a rotation of the lead screw. At least one stop pin is fixedly coupled to the lead screw, the at least one stop pin extends outwardly from the lead screw. At least one stop arm extends from the nut and is positioned to engage the stop pin to stop axial movement of the nut. The inner surface of the travel stop housing is engaged with an outer surface of the nut to prevent relative rotation of the nut.

In yet another aspect of the disclosed embodiments, a travel stop assembly may comprise a lead screw extending along an axis. A nut that is in threaded engagement with the lead screw and axially movable along the lead screw upon a rotation of the lead screw. At least one stop pin located in a first aperture in the lead screw and fixedly coupled therein. The at least one stop pin is positioned to engage the nut and to stop axial movement of the nut.

BRIEF DESCRIPTION OF THE DRAWINGS

The subject matter of the present disclosure is particularly pointed out and distinctly claimed in the claims at the conclusion of the specification. The foregoing and other features and advantages of the present disclosure are apparent from the following detailed description taken in conjunction with the accompanying drawings.

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
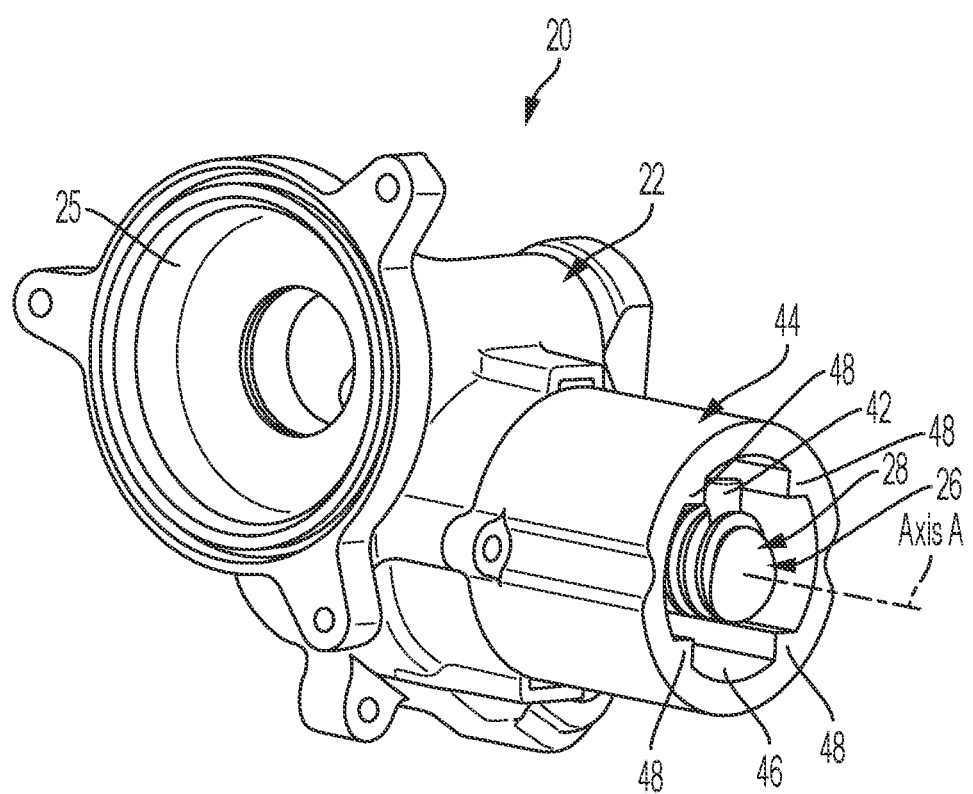
FIG. 1 depicts a perspective view of a travel stop assembly coupled to an assist housing.
Figure 2:
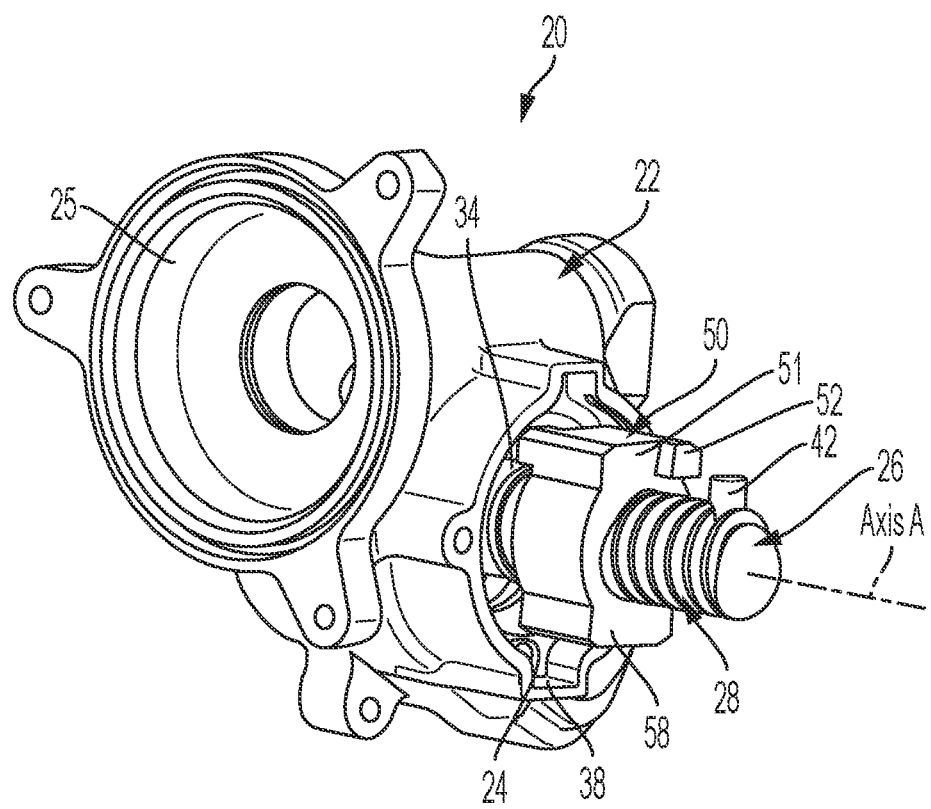
FIG. 2 depicts a perspective view of the travel stop assembly, without a travel stop housing, coupled to the assist housing.
Figure 3:
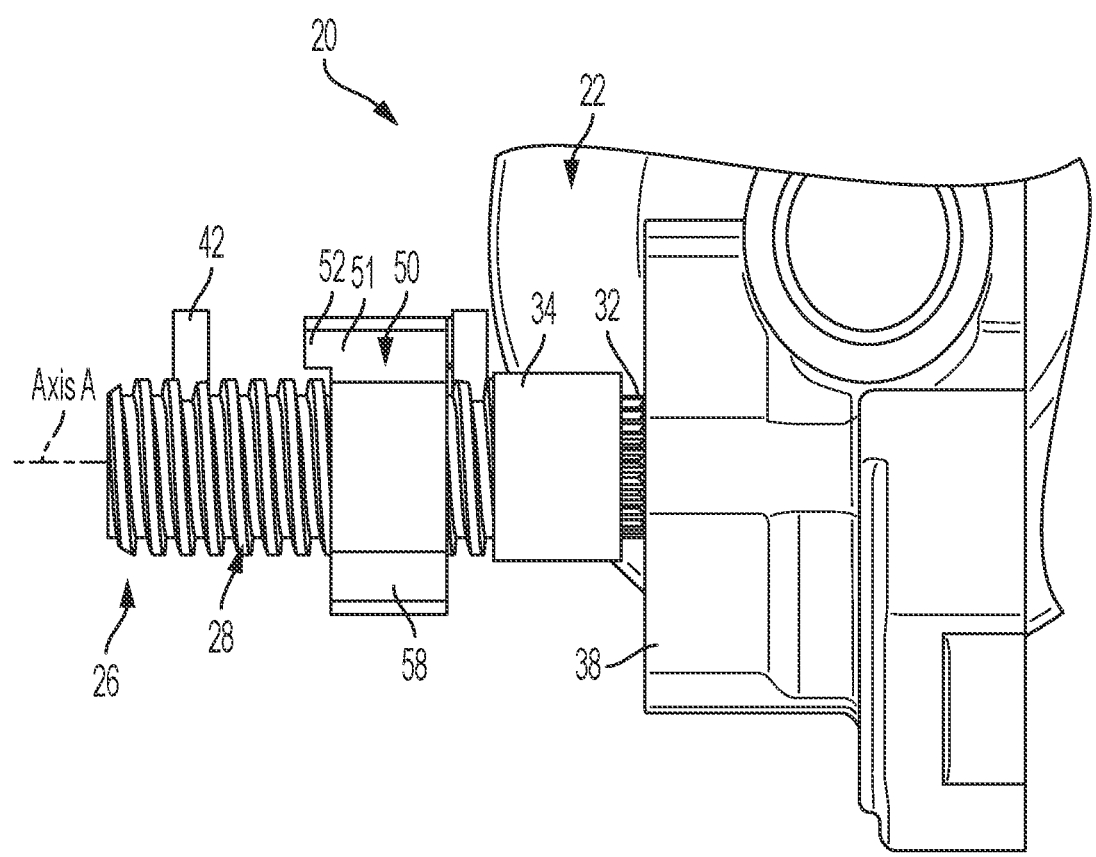
FIG. 3 depicts a side view of the travel stop assembly, without the travel stop housing, being inserted into a first opening of the assist housing.

With reference to FIGS. 1 through 3, a travel stop assembly 20 is generally illustrated. The travel stop assembly 20 may comprise an assist assembly 22 and a hand-wheel shaft 26. The assist assembly 22 comprises a first channel 24 (see FIG. 2) which receives a hand-wheel shaft 26 (see FIGS. 3-5), and a second channel 25 disposed perpendicular to the first channel 24. The hand-wheel shaft 26 extends along an axis A and is rotatable about the axis A. The first channel 24 may be aligned coaxial with the axis A.

Figure 4:
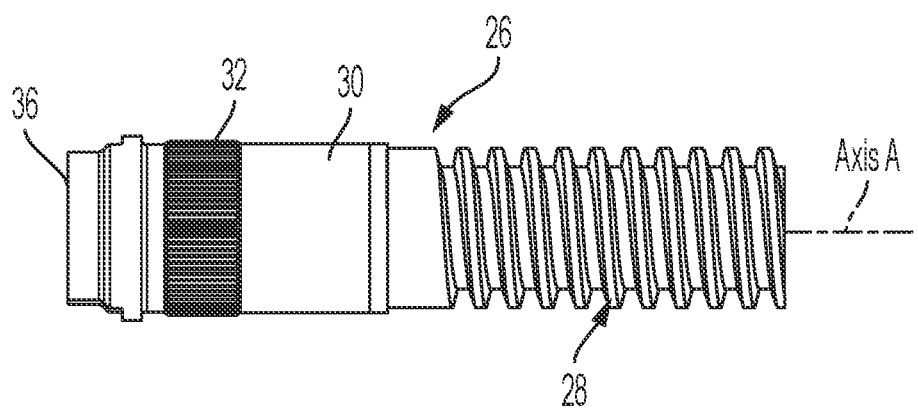
FIG. 4 depicts a side view of a portion of a hand-wheel shaft and illustrating an assist portion and a lead screw.
Figure 5:
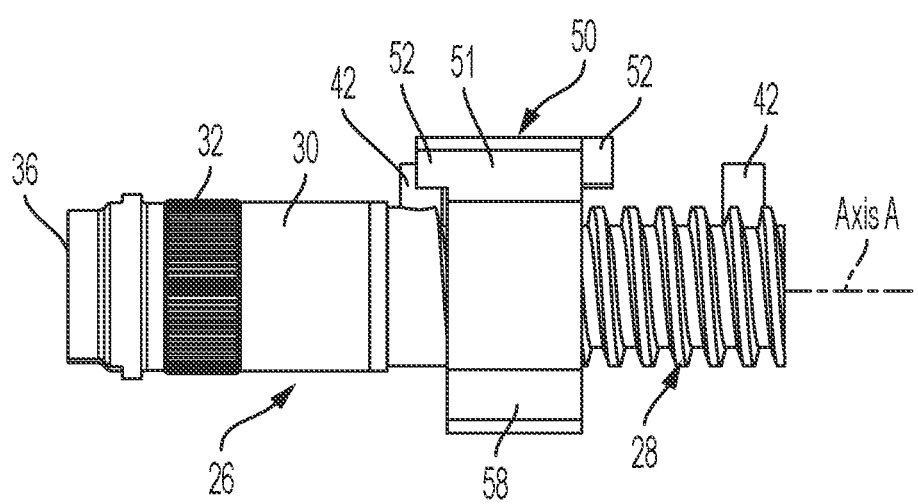
FIG. 5 depicts a side view of a portion of the hand-wheel shaft with the travel stop assembly coupled to the lead screw.
Figure 6:
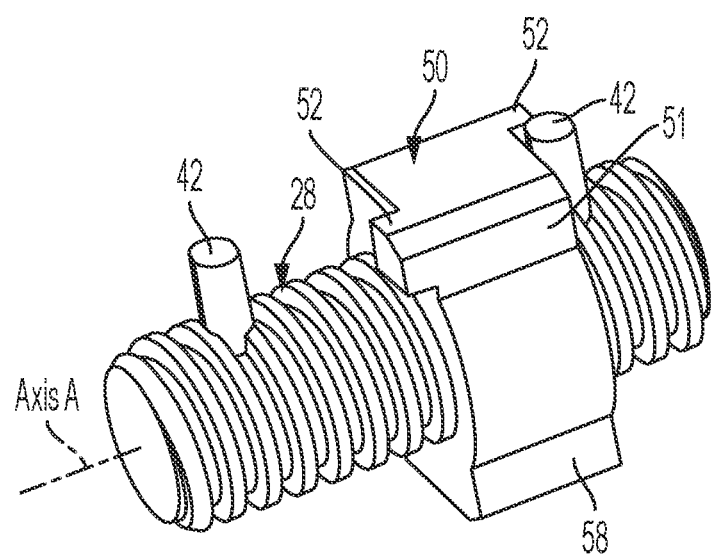
FIG. 6 depicts a perspective view of the lead screw of the hand-wheel shaft with a pair of pins and a nut.
Figure 7:
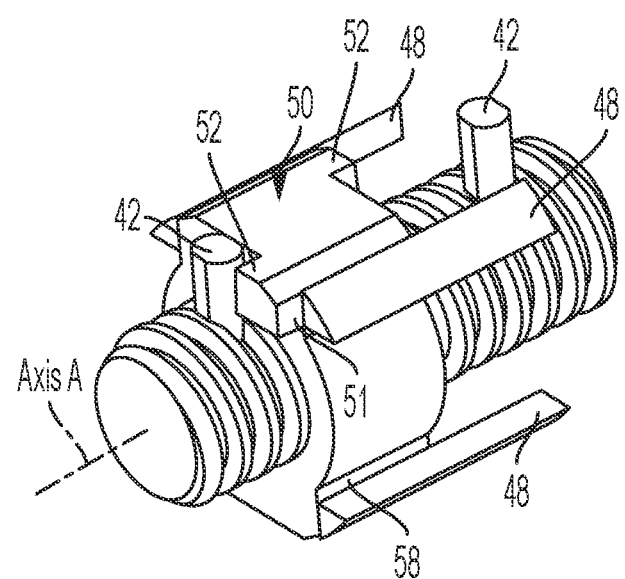
FIG. 7 depicts a perspective view of the lead screw of the hand-wheel shaft with the pair of pins and the nut, and illustrating a pair of rails of the travel stop housing in abutting contact with the nut.
Figure 8:
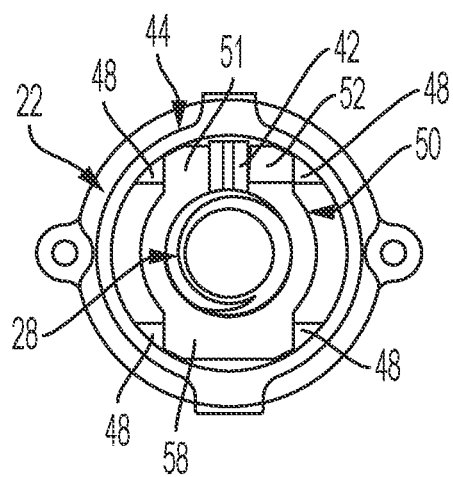
FIG. 8 depicts an end view of travel stop assembly taken from an end of the hand-wheel shaft.

With reference to FIGS. 1, 4 and 5, a lead screw 28 extends along the axis A and operatively engages to be rotatable with the hand-wheel shaft 26 about the axis A. The lead screw 28 may operatively engage the hand-wheel shaft 26 by being integral with, or attached to, the hand-wheel shaft 26. The lead screw 28 may also be at least partially disposed in a first channel 24. The lead screw 28 defines external threads 27, an assist portion 30, and a driven gear portion 32.

A coupling 34 (see FIG. 3) may surround the assist portion 30 to rotatably connect, in the first channel 24, the hand-wheel shaft 26 to the assist assembly 22. When rotatably coupled to the assist assembly 22, the lead screw 28 extends outwardly from the first channel 24 and the assist assembly 22, and the toothed portion 32 is disposed in the first channel 24. A hand wheel (not illustrated) may couple to, and rotate with, an end 36 of the hand-wheel shaft 26 next to the lead screw 28.

The assist assembly 22 further has a first fastening portion 38 which defines an opening of the first channel 24, and a second fastening portion 40 which defines an opening of the second channel 25. The second fastening portion 40 couples to a hand-wheel actuator (not illustrated) where a drive gear (not illustrated) of the HWA is received by the second channel 40 and engages the driven gear portion 32 of the hand-wheel shaft 26. The HWA, through the drive gear, is configured to cause rotation of the hand-wheel shaft 24, and in turn a hand-wheel, in response to external forces which cause rotation of the hand-wheel and/or other components of a vehicle.

As best illustrated in FIGS. 2-3, 5-11, the travel stop assembly 20 comprises a pair of stop pins 42 coupled to the lead screw 28, and the stop pins 42 are spaced apart from each other along a length (L) of a lead screw 28. The stop pins 42 are each positioned on the lead screw 26 to stop rotation of lead screw 26 about axis A.

A travel stop housing 44 couples to, or is integral with, the first fastening portion 38, and defines a third channel 46 coaxially aligned with, and extending from, the first channel 24. Accordingly, the lead screw 28 may be at least partially disposed in the first or third channel 24, 46. With the travel stop housing 44 coupled to the first fastening portion 38, the lead screw 28 is disposed in the third channel 46. A plurality of four rails 48, or a pair of rails 48, protrude from the travel stop housing 44 and into the third channel 46.

As best illustrated in FIGS. 3, 5-11, a nut 50 is threaded to the lead screw 26, and the nut 50 may be entirely disposed in the channel. The nut 50 is threaded to the lead screw 26 such that the nut 50 may rotate about the lead screw 26. Moreover, when the nut 50 is prevented from rotating, the nut 50 may translate axial along the axis A. The nut 50 defines internal threads 56 that engage the external threads 27 of the lead screw 26 to facilitate the threaded relationship between the external threads 27 and the lead screw 26. Additionally, the internal threads 56 of the nut 50, the external threads 27 of the lead screw 27, and pins 42 are arranged to facilitate axial movement of the nut 40 in direct relationship to the rotation of the lead screw 26, and the length (L) between the stop pins 42.

As discussed above, when rotation of the nut 50 is prevented and as the lead screw 26 rotates, the nut translates along the axis A and along the length (L). In some embodiments, the nut 50 may be operatively engaged with the travel stop housing 44 such that the travel stop housing 44 prevents rotations of the nut 50. In some embodiments, the rails 48 operatively engage an inner surface 47 of the travel stop housing 44 and are arranged to receive and prevent rotations of the nut 50. In some embodiments, the nut 50 has a lower protrusion 58 that engages one of the pairs of rails 48 to prevent rotation of the nut 50. The nut 50 may also have an upper protrusion 51 opposing the lower protrusion 52 which may also engage a pair of rails 48 to prevent rotation of the nut 50.

In some embodiments, the nut 50 and the upper protrusion 51 may be of a plastic material. In such embodiments, the upper protrusion 51 operatively engages one of the pairs of rails 48 to prevent rotation of the nut 50 and to facilitate axial movement of the nut 50 along the length (L). The stop arms 52 may be coupled to the upper protrusion 51, and the stop arms 52 may be disposed on opposite sides of and extend from, in opposing axial directions, the upper protrusion 51.

Figure 12:
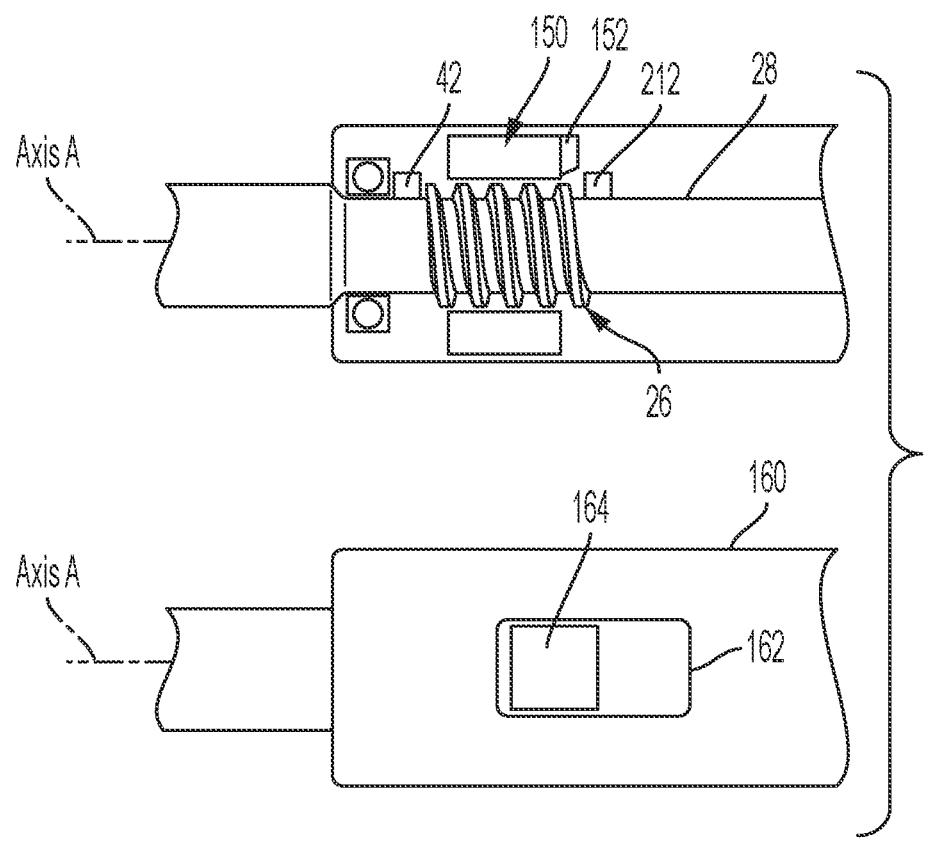
FIG. 12 depicts an embodiment of a travel stop assembly with a travel stop housing having a slot and a nut with a guide engaged with the slot.
Figure 13:
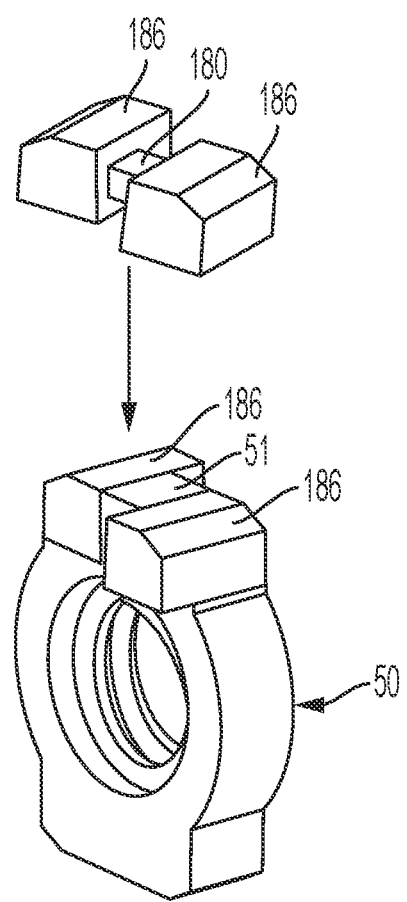
FIG. 13 depicts an embodiment of a travel stop assembly with a nut.
Figure 14:
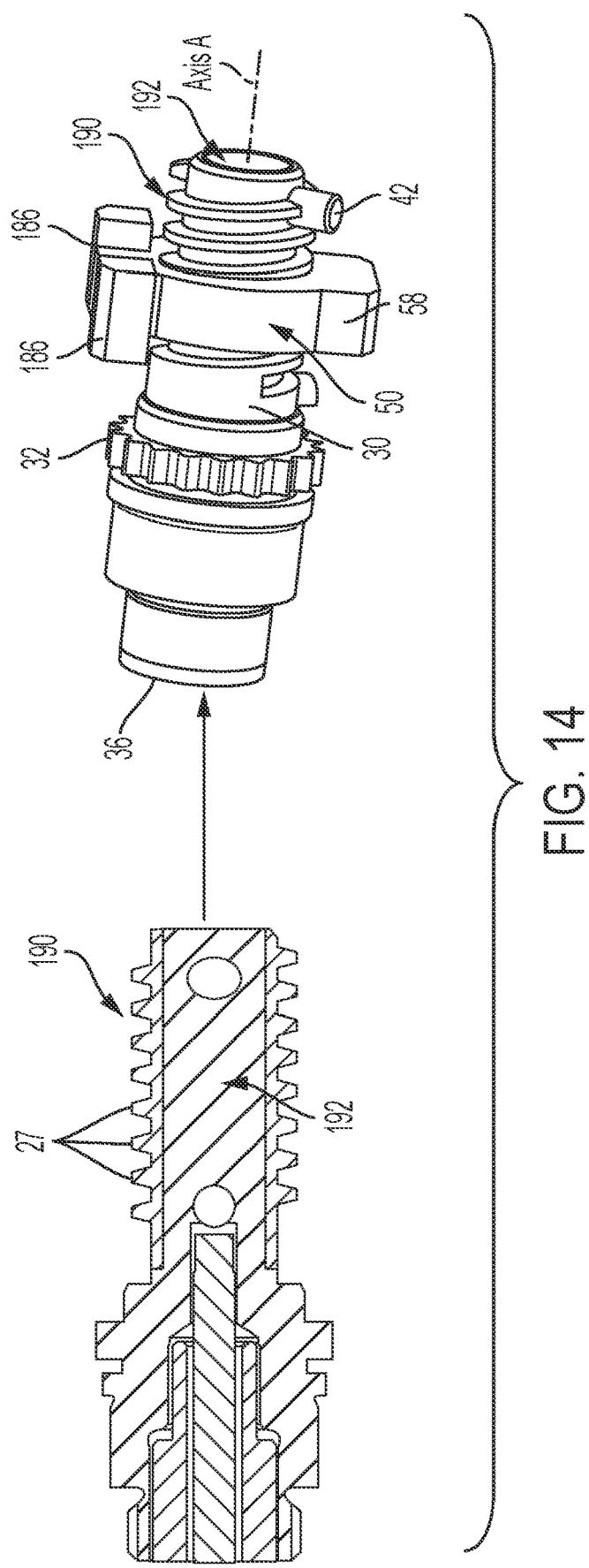
FIG. 14 depicts an embodiment of a travel stop assembly with a thread sleeve coupled to a hand-wheel shaft.

In some embodiments, such as the embodiments illustrated in FIG. 12, a guide protrusion 164 may extend from the nut 50 and is perpendicular to the axis A when the nut 50 is threaded to the lead screw 28. In some embodiments, such as the one illustrated in FIGS. 13 and 14, an arm bar 180 extends between ends 182, 184 and the stop arms 186. More specifically, the arm bar 180 couples between the stop arms 186 and the stop arms 186 are disposed at and coupled to a respective end 182, 184 and the stop arms 186 extend perpendicularly, in opposing directions, from the arm bar 180. In some embodiments, the arm bar 180 and the stop arms 186 may be of a different material, such as metal, whereas the nut 50 and the upper protrusion 51 may be of a plastic material. In this embodiments, the upper protrusion 51 defines a slot 188 and the arm bar 180 is disposed in and operatively engaged with the slot 188 such that the stop arms 186 are disposed on opposite sides of and extend, in opposing axial directions, from the upper protrusion 51. In this embodiment, a sleeve 190 is operatively engaged with a periphery of the shaft 126 and the sleeve 190 defines the plurality of external threads 27 to establish the lead screw 192. In some embodiments, the sleeve 190 may also be of a plastic material. With the sleeve 190 and nut 50 being of a plastic material, the plastic material may dampen forces being applied to the sleeve 190 and/or 50 when the stop arms 186 engage the stop pins 42.

When in threaded engagement with the lead screw 28, the nut 50 is disposed in the third channel 46 and is positioned between the stop pins 42. Moreover, the nut 50 is received by, and in abutting contact with, the rails 48. The nut 50 further has a pair of stop arms 52 positioned opposite one another, and extending in a direction parallel to the axis and each stop arm 52 is configured to engage a respective stop pin 42 to stop axial movement of the nut 50 in an axial direction along the axis A and to prevent rotation of the lead screw 28. The nut 50 may have only one arm 52, two arms, or any number of arms.

In some embodiments, and as illustrated in FIG. 12, a travel stop housing 160 may define a housing slot 162 for receiving a guide protrusion 164 of the nut 166. The guide protrusion 164 may operatively engage the slot 162 to facilitate axial movement of the nut along the length (L) by preventing rotation of the nut 50. The slot may have any number of lengths.

In operation, when the hand-wheel shaft 26 is rotated by the HWA or by rotation of the steering wheel, the rotation is limited by the travel stop assembly 20. More specifically, rotation of the hand-wheel shaft 26, and in turn the lead screw 28, causes the male threads to engage the female threads, which causes the nut 50 to engage the rails 48 and to translate linearly within the third channel 46. After pre-determined rotation of the hand-wheel shaft 26 in a first direction, the translation of the nut 50 causes one of the stop arms 52 to engage one of the stop pins 42 to stop, or prevent, further rotation of the hand-wheel shaft 26 in the first direction. The engagement between the nut 50 and the stop pins 42 provides a "hard stop" to rotation of the hand-wheel shaft 26, and in turn the hand wheel. However, the hand-wheel shaft 26 is free to rotate in a second direction opposite the first direction.

The travel stop assembly 20 of the present disclosure is advantageous over the prior art as it provides a cost effective, and modifiable, travel stop assembly. More specifically, and with reference to FIGS. 9-11, the threaded engagement, i.e., size and spacing of the male and female threads, spacing and position of the stop pins 42, and the width of the nut 50, may be configured to provide precise translation of the nut 50 in relationship to rotational limits of the hand-wheel shaft 26, and in turn the hand wheel, to provide the "hard stop."

Figure 9:
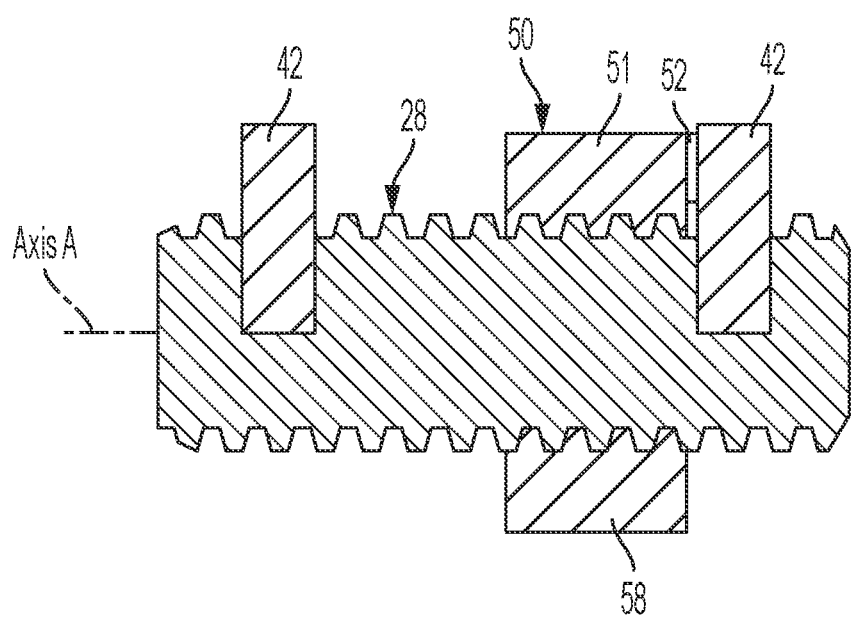
FIG. 9 depicts a side view of the lead screw of the hand-wheel shaft with the pair of pins and the nut, and illustrating the pin spacing and width of the nut.
Figure 10:
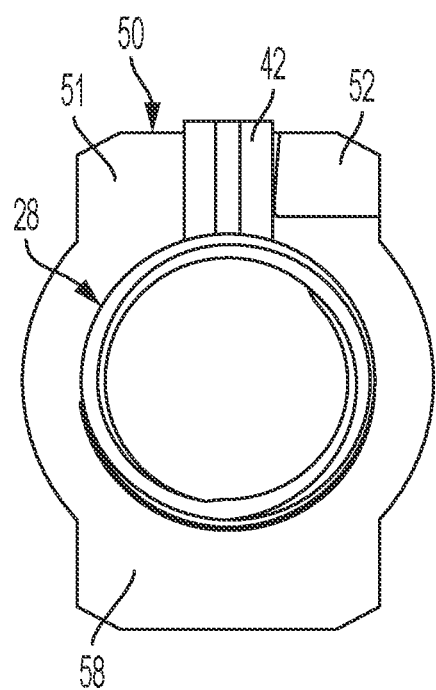
FIGS. 10 and 11 depict an end view of the lead screw of the hand-wheel shaft with the pair of pins and the nut, and illustrating the pins positioned at various angular positions.
Figure 11:
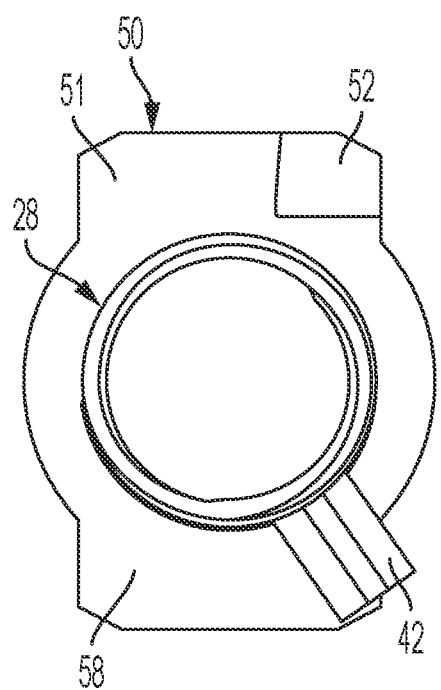

In one example, based on a specific customer's specifications, and with reference to FIG. 9, the spacing of the stop pins 42 can be adjusted. Advantageously, with the spacing of the stop pins 42 being adjustable, the hand-wheel shaft 26, nut 50, and the traveling stop housing 44 do not need to be changed, which simplifies the manufacture, in a cost effective manner, various embodiments of the travel stop assembly 20 to meet diverse customer demands. In another example, and with reference to FIGS. 10 and 11, the angular position, relative to an axis of rotation of the hand-wheel shaft 26, of the stop pins 42 may be adjusted to achieve the same results, and achieve a 12 o'clock start and stop position of the hand-wheel shaft 26 and/or hand-wheel. In yet another example, the width of the nut 50 may be adjusted to achieve the same results as above.

The disclosed travel stop assembly 20 is advantageous as the tolerance and dimensions of one or more of its elements may be adjusted to prevent "early" or "late" contact, or other undesired contact, between the nut 50 and stop pins 42. Further, the disclosed travel stop assembly 20 provides NVH benefits by at least reducing the number of elements moving relative to one another. Of course, one of skill in the art will appreciate the many other benefits of the present disclosure.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A travel stop assembly comprising:
   a travel stop housing having an inner surface defining a channel extending along an axis;
   a lead screw at least partially located in the channel;
   a nut in threaded engagement with the lead screw and axially movable along the lead screw upon a rotation of the lead screw;
   at least one stop pin fixedly coupled to the lead screw, the at least one stop pin extending outwardly from the lead screw, wherein the at least one stop pin includes a first stop pin located on a first axial side of the nut and a second pin is spaced from the first stop pin on a second axial side of the nut;
   at least one rail fixed to the inner surface of the travel stop housing and extending towards the lead screw to prevent rotation of the nut; and
   at least one stop arm extending from the nut and positioned to engage the stop pin to stop axial movement of the nut.

2. The assembly of claim 1, wherein the lead screw defines an external thread and the nut defines an internal thread, wherein the internal and external threads facilitate a threaded engagement of the nut to the lead screw, and the first stop pin and second stop pin are spaced to limit the axial movement of the nut and rotation of the lead screw between the first stop pin and the second stop pin.

3. The assembly of claim 2, wherein a shaft extends along an axis and is rotatable about the axis and a sleeve is operatively engaged with a periphery of the shaft and wherein the sleeve defines the lead screw.

4. The assembly of claim 2, wherein the at least one rail includes a first pair of rails arranged on different lower sides of the nut.

5. The assembly of claim 4, wherein the nut has a lower protrusion that slidably engages the first pair of rails.

6. The assembly of claim 5, wherein the at least one rail further includes a second pair of rails arranged on different upper sides of the nut.

7. The assembly of claim 6, wherein the nut has an upper protrusion that slidably engages the second pair of rails.

8. The assembly of claim 1, wherein the at least one stop arm includes a first stop arm extending towards the first stop pin and a second stop arm extending towards the second stop pin.

9. The assembly of claim 1, wherein the at least one stop arm is perpendicular to the at least one stop pin.

10. A travel stop assembly comprising:
    a travel stop housing having an inner surface defining a channel extending along an axis;
    a lead screw at least partially located in the channel;
    a nut in threaded engagement with the lead screw and axially movable along the lead screw upon a rotation of the lead screw;
    at least one stop pin fixedly coupled to the lead screw, the at least one stop pin extending outwardly from the lead screw;
    at least one stop arm extending from the nut and positioned to engage the stop pin to stop axial movement of the nut; and
    the inner surface of the travel stop housing engaged with an outer surface of the nut to prevent relative rotation of the nut, wherein the outer surface of the nut includes at least one protrusion extending away from the axis, wherein the inner surface of the travel stop housing defines a housing slot extending along the axis and the at least one protrusion is slidably received within the housing slot, wherein the at least one stop pin includes a first stop pin located on a first axial side of the housing slot and a second pin is spaced from the first stop pin on a second axial side of the housing slot.

11. A travel stop assembly comprising:
a travel stop housing having an inner surface defining a channel extending along an axis;
a lead screw at least partially located in the channel;
a nut in threaded engagement with the lead screw and axially movable along the lead screw upon a rotation of the lead screw;
at least one stop pin fixedly coupled to the lead screw, the at least one stop pin extending outwardly from the lead screw;
at least one stop arm extending from the nut and positioned to engage the stop pin to stop axial movement of the nut; and
the inner surface of the travel stop housing engaged with an outer surface of the nut to prevent relative rotation of the nut, wherein the outer surface of the nut includes at least one protrusion extending away from the axis, wherein the inner surface of the travel stop housing defines at least one pair of rails extending towards the lead screw on different sides of the at least one protrusion to prevent rotation of the nut.

12. A travel stop assembly comprising:
a travel stop housing having an inner surface defining a channel extending along an axis;
a lead screw at least partially located in the channel;
a nut in threaded engagement with the lead screw and axially movable along the lead screw upon a rotation of the lead screw;
at least one stop pin fixedly coupled to the lead screw, the at least one stop pin extending outwardly from the lead screw;
at least one stop arm extending from the nut and positioned to engage the stop pin to stop axial movement of the nut; and
the inner surface of the travel stop housing engaged with an outer surface of the nut to prevent relative rotation of the nut, wherein the outer surface of the nut includes at least one protrusion extending away from the axis, wherein the at least one stop arm extends from the at least one protrusion.

13. The assembly of claim 12, wherein the at least one stop arm includes a pair of stop arms that extend from the at least one protrusion in opposite directions with respect to the axis.

14. A travel stop assembly comprising:
a lead screw extending along an axis;
a nut in threaded engagement with the lead screw and axially movable along the lead screw upon a rotation of the lead screw;
at least one stop pin located in a first aperture in the lead screw and fixedly coupled therein; and
the at least one stop pin positioned to engage the nut and to stop axial movement of the nut, wherein nut includes at least one stop arm to engage the at least one stop pin, wherein the at least one stop pin includes a first stop pin located the first aperture in the lead screw and a second stop pin located in a second aperture in the lead screw that is spaced along the axis from the first aperture, and wherein the at least one stop arm includes a first stop arm extending towards the first stop pin and a second stop arm extending towards the second stop pin.

* * * * *